(12) United States Patent
Lee et al.

(10) Patent No.: US 10,851,004 B2
(45) Date of Patent: Dec. 1, 2020

(54) WASTE WATER TREATMENT METHOD AND APPARATUS

(71) Applicant: Seaon, LLC

(72) Inventors: Soon-Hyoung Lee, Busan (KR); Woo-Chul Lee, Incheon (KR)

(73) Assignee: SEAON, LLC, Hilo, HI (US)

( * ) Notice: Subject to any disclaimer, the term of this patent is extended or adjusted under 35 U.S.C. 154(b) by 781 days.

(21) Appl. No.: 15/486,260

(22) Filed: Apr. 12, 2017

(65) Prior Publication Data

US 2018/0297877 A1     Oct. 18, 2018

(51) Int. Cl.
| | |
|---|---|
| *C02F 1/24* | (2006.01) |
| *C02F 9/02* | (2006.01) |
| *C02F 9/00* | (2006.01) |
| C02F 11/122 | (2019.01) |
| C02F 1/00 | (2006.01) |
| C02F 1/32 | (2006.01) |
| C02F 1/52 | (2006.01) |
| C02F 1/76 | (2006.01) |
| C02F 103/00 | (2006.01) |

(52) U.S. Cl.
CPC ............... *C02F 9/00* (2013.01); *C02F 1/004* (2013.01); *C02F 1/24* (2013.01); *C02F 1/32* (2013.01); *C02F 1/52* (2013.01); *C02F 1/76* (2013.01); *C02F 11/122* (2013.01); *C02F 2103/008* (2013.01); *C02F 2201/008* (2013.01); *C02F 2301/046* (2013.01); *C02F 2303/04* (2013.01); *Y02W 10/10* (2015.05)

(58) Field of Classification Search
CPC ........ C02F 9/00; C02F 1/24; C02F 2103/008; C02F 1/004; C02F 1/32; C02F 1/52; C02F 1/76; C02F 2201/008; C02F 2301/046; C02F 2303/04; Y02W 10/10
USPC .................................................. 210/703, 712
See application file for complete search history.

(56) References Cited

U.S. PATENT DOCUMENTS

| | | | |
|---|---|---|---|
| 3,966,598 A | 6/1976 | Ettelt | |
| 4,105,556 A | 8/1978 | D'Amaddio et al. | |
| 4,124,499 A * | 11/1978 | Hobbs | C02F 9/00 210/667 |
| 5,643,453 A | 7/1997 | Pannier et al. | |
| 6,488,854 B2 | 12/2002 | O'Leary et al. | |
| 6,921,478 B2 | 7/2005 | Lambert et al. | |
| 7,037,432 B2 | 5/2006 | Eades et al. | |
| 8,518,266 B2 | 8/2013 | Roberts et al. | |

(Continued)

OTHER PUBLICATIONS

International Search Report and Written Opinion of the International Searching Authority in the copending PCT patent application: PCT/US2017/054656 claiming priority to the present application, with international filing date Sep. 30, 2017, and dated Feb. 5, 2018.

*Primary Examiner* — Thomas M Lithgow
(74) *Attorney, Agent, or Firm* — James L. Farmer

(57) ABSTRACT

Provided is a method and device for a waste water treatment process. In one exemplary embodiment influent waste water and a defined portion of treated effluent water are combined during a first time interval to produce pretreated water. The pretreated water is dosed with selective chemical additives formulated to cause separation of solid and liquid media during a second time interval, producing separated water. Remaining solid media is removed from the separated water with a sludge filter to produce treated effluent water.

11 Claims, 2 Drawing Sheets

(56) References Cited

U.S. PATENT DOCUMENTS

| | | |
|---|---|---|
| 9,120,686 B2 | 9/2015 | Kuehnle et al. |
| 9,422,168 B2 | 8/2016 | Mane et al. |
| 2002/0017483 A1* | 2/2002 | Chesner ................ B01D 61/16 210/198.1 |
| 2004/0168964 A1 | 9/2004 | Lambert et al. |
| 2005/0236327 A1 | 10/2005 | Gordon et al. |
| 2007/0114182 A1* | 5/2007 | DePoli ..................... C02F 9/00 210/703 |
| 2009/0107915 A1 | 4/2009 | Skinner et al. |

* cited by examiner

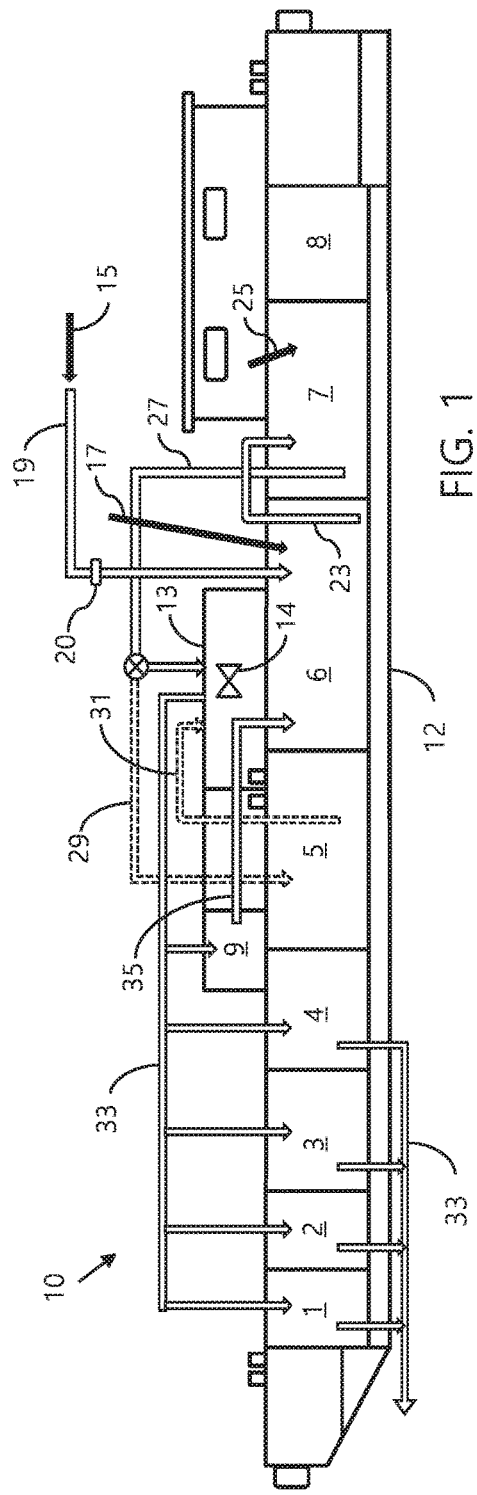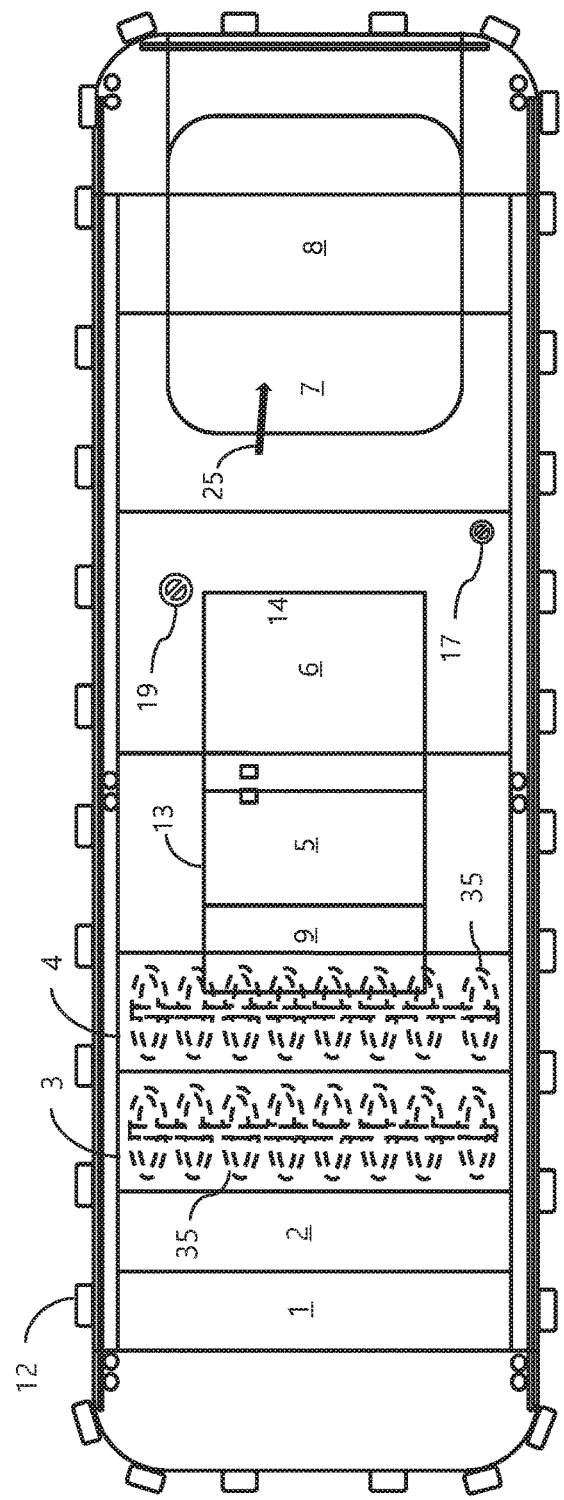

WASTE WATER TREATMENT METHOD AND APPARATUS

TECHNICAL FIELD AND BACKGROUND

The technical field of the present invention relates to methods and apparatus for treating waste water such as raw sewage, industrial or other waste byproducts, and combinations thereof.

BRIEF DESCRIPTION OF THE DRAWINGS

In the accompanying drawings:

FIG. 1 is a partial cut-away side view of an exemplary waste water treatment system in the form of a floating barge;

FIG. 2 is a top view of the barge embodiment of the waste water treatments system of FIG. 1.

DESCRIPTION OF THE EMBODIMENTS

Figure 3:
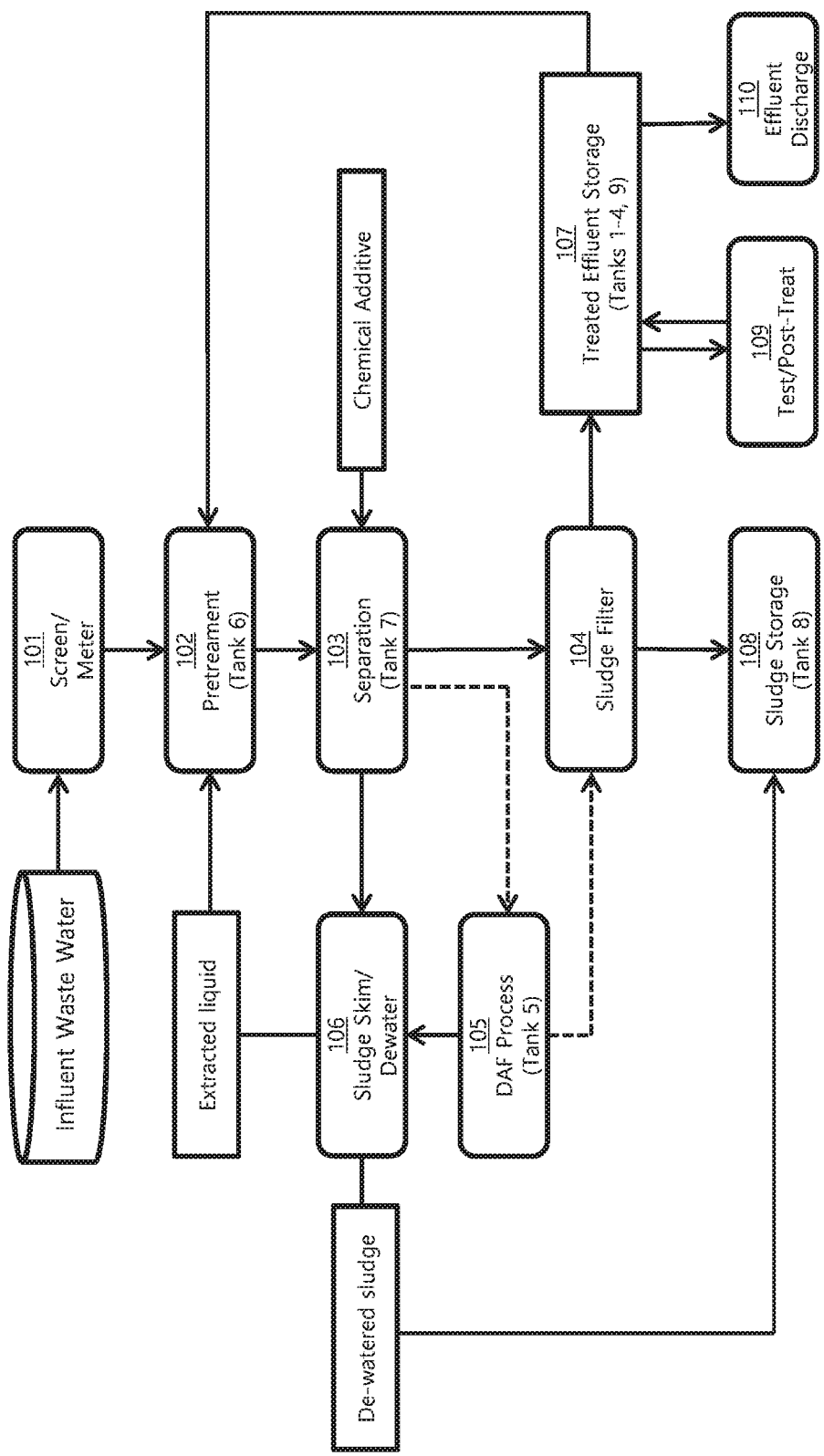
FIG. 3 is a flowchart depicting a waste water treatment process in accordance with the present disclosure.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing Figures, and initially to FIGS. 1 and 2, an exemplary waste water treatment system is indicated generally at reference numeral 10. The system includes a series of treatment and holding tanks, pumps, filters, and other specialized equipment for handling the various liquid and solid media produced throughout the treatment process. In the depicted embodiment of FIGS. 1 and 2, the treatment system 10 and a series of tanks 1 through 9 are built into a floating barge 12, and as such are particularly suited to treat waste water pumped from the waste storage tanks of ocean-going ships. However, it should be appreciated that the waste water treatment system is not limited to barges or water-borne embodiments, and may include for example various land based applications such as industrial or community water treatment facilities.

Continuing with the embodiment of FIGS. 1 and 2, a first treatment tank 6 is configured to produce pretreated water by combining influent waste water with a pretreatment additive, indicated respectively at arrows 15 and 17. The influent waste water may comprise various organic content effluents, such as raw sewage, industrial or other waste materials, or combinations thereof. The influent waste water may be pumped through an inlet pipe 19 from the source, such as the above-mentioned ship waste storage tank, past a bar screen 20, and directly into the first treatment tank 6. The bar screen 20 is configured to remove large contaminants or foreign objects, and may be located anywhere between the influent waste water source and the first treatment tank.

Along with the influent waste water, a predefined quantity of the pretreatment additive 17 is also introduced and combined with the influent waste water. The pretreatment additive 17, described in more detail below, comprises a treated liquid output (or "effluent") of a waste water treatment process, such as that of treatment system 10. In one embodiment the predefined quantity of pretreatment additive is in the range of five to ten percent of the combined contents of tank 6, and in a more specific embodiment approximately seven percent. Once the first treatment tank is filled, the combined contents are maintained in the tank, and optionally also mixed by agitation or stirring, for a predefined first time interval selected to produce pretreated water. For example, a first time interval for adequate pretreatment of raw sewage at a uniform incoming temperature of about 50 deg. F. may be approximately 45 minutes.

At the end of the first time interval, the pretreated water is transferred or pumped from the first treatment tank 6, for example through a conduit 23, into a second treatment tank 7. The second treatment tank is configured to produce separated water by introducing selective chemical additives 25 to the pretreated water. The particular chemical additives 25 are specifically formulated to encourage separation of solid and liquid media, and may be any of various known coagulants and flocculants typically used in waste water treatment processes. The chemically treated contents are maintained in the second treatment tank 7, and optionally also agitated or stirred, for a predefined second time interval selected to produce adequate separation of the solid and liquid media. For example, an adequate second time interval may be about 45 minutes.

After the second time interval, the separated water is pumped from the second treatment tank 7 through a conduit 27 to the sludge filter 14. In a barge embodiment of the treatment system, the sludge filter 14 may be inside a utility housing structure 13, as generally suggested in FIG. 1, together with other system mechanical components such as pumps, compressors, and the like. The sludge filter 14 may be any suitable porous membrane configured to remove solid media that is still in solution or was otherwise not separated out and removed in the second treatment tank. Sludge collected by the filter 14 may be periodically transferred into the sludge tank 8.

Optionally, under certain conditions or to meet certain requirements, the separated water in the second treatment tank 7 may receive further treatment before going to the sludge filter 14. Referring still to FIG. 1, after the second time interval the separated water may be pumped from tank 7 through a conduit 29 (shown in dashed lines) to a third treatment tank 5. In tank 5 the separated water is treated by a dissolved air flotation ("DAF") process for a predefined third time interval to separate and float solid media still present in the water after the chemical treatment process. At the end of the third time interval the separated liquid is pumped from tank 5 through a conduit 31 to the sludge filter 14.

The water exiting the sludge filter is treated effluent water suitable for immediate use as pretreatment additive 17. In the depicted barge embodiment, the treated effluent is pumped from the sludge filter through a conduit 33 to one or more of the effluent holding tanks 1, 2, 3, 4, and 9. The treated effluent water may be held in these tanks for days or weeks if needed before being discharged through conduit 33 into the surrounding water, or being withdrawn for use as pretreatment additive in tank 6. One or more effluent holding tanks may be located above the deck of the barge 12 to conveniently allow for gravity feed of the treated effluent water. For example, treated effluent water may be gravity fed from tank 9 through a conduit 35 for the purpose of dosing the first treatment tank 6 with pretreatment additive 17.

Some or all of the effluent holding tanks may incorporate equipment for performing post-treatment of the effluent water. The effluent water in the holding tanks may be periodically tested to measure and determine the level of contaminants in the water using well known indicators such as turbidity and surface loading rate. The measured contaminants may be compared, for example, to industry established limits or local standards as appropriate. If such testing indicates excess contaminants, appropriate post-treatment may be performed in the holding tanks to disinfect the water before being discharged or off-loaded. The post-treating of the treated effluent water may be through the application of a radiated energy treatment methodology, such as the ultraviolet ("UV") radiation sources 35 indicated in FIG. 2 at holding tanks 3 and 4, or through a chemical disinfection process such as chlorine treatment.

Additional pretreatment additive 17 may be obtained from certain solid media byproducts of the above-described treatment processes. Coagulated solid media produced by the chemical treatment process, and floated solid media produced by the DAF process when used, may be skimmed from the tops of treatment tanks 7 and 5. The collected sludge then undergoes a dewatering process using, for example, a conventional sludge press to extract a majority of the liquid present in the sludge. The extracted liquid comprises another source of the treated effluent water, and as such may also be used as pretreatment additive 17 in the first treatment tank. In the barge embodiment this treated effluent from the dewatering process may be pumped directly to the first treatment tank to supplement pretreatment additive being fed to tank 6 from effluent holding tanks 3, 4, or 9. The left over sludge from dewatering may be further treated with known dehydration processes, and stored for eventual disposal.

An exemplary waste water treatment process in accordance with the present invention is depicted in FIG. 3. The process begins with pumping the influent waste water past a bar screen and a flow meter (step 101), and into tank 6 for pretreatment. A predefined quantity of pretreatment additive 17 is added, and the combined contents of tank 6 are mixed and maintained for a first time interval (step 102). The pretreatment additive is the treated effluent water from tanks 3, 4, or 9, entirely or in combination with extracted liquid from the dewatering process (step 106). In one exemplary embodiment the quantity of pretreatment additive is approximately 7 percent by volume of the contents of tank 6.

After completion of the first time interval, the liquid contents of tank 6 (excluding floated solid media) are transferred to tank 7, and therein dosed with chemical additives formulated to encourage separation of the contents through coagulation or flocculation of solid media. The combined contents are maintained and optionally circulated in tank 7 for a third time interval sufficient to produce a desired amount of separation (step 103).

After the third time interval the separated water is extracted from tank 7 and passed through the sludge filter (step 104), outputting treated effluent water and capturing any solid media still contained in the water. The treated effluent water is transferred to the effluent storage tanks (step 107), where it is available for use as pretreatment additive, while the captured sludge is transferred to tank 8 for storage and disposal.

Alternatively, the separated water from tank 7 may be transferred to tank 5 for further separation by dissolved air flotation (DAF) before the filtering step. The stored treated effluent water in holding tanks 1 through 4 may be post-treated (step 109) prior to being discharged (step 110) or used as a pretreatment additive.

Solid media floated by the separation processes of steps 103 and 105 may be skimmed from tanks 5 and 7 and de-watered using known pressing techniques (step 106). The extracted liquid from de-watering may be used in tank 6 as pretreatment additive, supplementing the treated effluent water additive drawn from tank 9. The pressed sludge may be further dehydrated through heated drying, and/or transferred to tank 8 for storage or disposal.

There has been described a novel waste water treatment process with substantially improved stability and processing time through use of a novel pretreatment additive. For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A waste water treatment process, comprising:
    withdrawing a defined quantity of treated effluent water from a pretreatment additive holding tank;
    combining influent waste water and the defined quantity of treated effluent water in a first treatment tank during a first time interval to produce pretreated water;
    producing separated water by dosing the pretreated water with selective chemical additives formulated to cause separation of solid and liquid media in a second treatment tank during a second time interval;
    substantially removing solid media contained in the separated water with a filter to produce treated effluent water;
    collecting floating sludge from one of the second or a third treatment tank; and
    extracting treated effluent water from the floating sludge, wherein a portion of the treated effluent water combined with influent waste water in the first treatment tank is treated effluent water extracted from the floating sludge.

2. The waste water treatment process of claim 1, further comprising recharging the pretreatment additive holding tank with the treated effluent water from the filter.

3. The waste water treatment process of claim 1, wherein the selective chemical additives cause separation of solid and liquid media by encouraging coagulation or floatation of the solid media.

4. The waste water treatment process of claim 1, further comprising treating the separated water by a dissolved air flotation process in the third tank for a third time interval prior to removing solid media with the sludge filter.

5. The waste water treatment process of claim 1, wherein the defined quantity of treated effluent water is in the range of five to ten percent of the combined volume of influent waste water treated effluent water.

6. The waste water treatment process of claim 1, wherein the influent waste water is pumped from a storage tank in an ocean-going ship, and wherein the water treatment process is carried out on a floating barge.

7. The waste water treatment process of claim 6, wherein the barge comprises a series of tanks disposed one adjacent another in a longitudinal direction of the barge.

8. The waste water treatment process of claim 7, further comprising discharging treated effluent water from the barge into surrounding water.

9. The waste water treatment process of claim 8, further comprising post-treating the treated effluent water before discharging it into surrounding water or using it as a pretreatment additive.

10. The water treatment process of claim 9, wherein the post-treating of the treated effluent water is through the application of radiated energy or a chemical disinfection treatment.

11. The water treatment process of claim 10, wherein the radiated energy treatment uses ultra-violet radiation, and the chemical disinfection treatment uses chlorine.

\* \* \* \* \*